US008589361B2

(12) United States Patent
Hu et al.

(10) Patent No.: US 8,589,361 B2
(45) Date of Patent: Nov. 19, 2013

(54) REDUCED DISK SPACE STANDBY

(75) Inventors: Wei Ming Hu, Palo Alto, CA (US);
Juan R. Loaiza, Woodside, CA (US);
Yunrui Li, Fremont, CA (US); Vinay H. Srihari, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 181 days.

(21) Appl. No.: 12/871,795

(22) Filed: Aug. 30, 2010

(65) Prior Publication Data

US 2012/0054158 A1    Mar. 1, 2012

(51) Int. Cl.
*G06F 17/00* (2006.01)

(52) U.S. Cl.
USPC .......................................... 707/692; 707/769

(58) Field of Classification Search
USPC ................................................. 707/692, 769
See application file for complete search history.

(56) References Cited

U.S. PATENT DOCUMENTS

| 5,095,421 A | 3/1992 | Freund |
| 5,123,099 A | 6/1992 | Shibata et al. |
| 5,241,675 A | 8/1993 | Sheth et al. |
| 5,263,156 A | 11/1993 | Bowen et al. |
| 5,287,496 A | 2/1994 | Chen et al. |
| 5,333,265 A | 7/1994 | Orimo et al. |
| 5,333,316 A | 7/1994 | Champagne et al. |
| 5,355,477 A | 10/1994 | Strickland et al. |
| 5,369,757 A | 11/1994 | Spiro et al. |
| 5,388,196 A | 2/1995 | Pajak et al. |
| 5,423,037 A | 6/1995 | Hvasshovd |
| 5,454,102 A | 9/1995 | Tang et al. |
| 5,553,279 A | 9/1996 | Goldring |
| 5,555,404 A | 9/1996 | Torbj.oslashed.rnsen et al. |
| 5,559,991 A | 9/1996 | Kanfi |
| 5,566,315 A | 10/1996 | Milillo et al. |
| 5,574,906 A | 11/1996 | Morris |

(Continued)

FOREIGN PATENT DOCUMENTS

EP    0 501 180 A    9/1992

OTHER PUBLICATIONS

Bober, Paul M., et al., "On Mixing Queries and Transactions via Multiversion Locking", Computer Sciences Department, University of Wisconsin, 1992, pp. 535-545.

(Continued)

*Primary Examiner* — Wilson Lee
*Assistant Examiner* — Tiffany Thuy Bui
(74) *Attorney, Agent, or Firm* — Hickman Palermo Truong Becker Bingham Wong LLP

(57) ABSTRACT

A method and system for replicating database data is provided. One or more standby database replicas can be used for servicing read-only queries, and the amount of storage required is scalable in the size of the primary database storage. One technique is described for combining physical database replication to multiple physical databases residing within a common storage system that performs de-duplication. Having multiple physical databases allows for many read-only queries to be processed, and the de-duplicating storage system provides scalability in the size of the primary database storage. Another technique uses one or more diskless standby database systems that share a read-only copy of physical standby database files. Notification messages provide consistency between each diskless system's in-memory cache and the state of the shared database files. Use of a transaction sequence number ensures that each database system only accesses versions of data blocks that are consistent with a transaction checkpoint.

10 Claims, 6 Drawing Sheets

(56) References Cited

U.S. PATENT DOCUMENTS

| | | | |
|---|---|---|---|
| 5,581,753 A * | 12/1996 | Terry et al. | 707/999.201 |
| 5,603,024 A | 2/1997 | Goldring | |
| 5,613,113 A | 3/1997 | Goldring | |
| 5,806,076 A | 9/1998 | Ngai et al. | |
| 5,870,758 A | 2/1999 | Bamford et al. | |
| 5,924,096 A | 7/1999 | Draper et al. | |
| 5,956,731 A | 9/1999 | Bamford et al. | |
| 5,974,427 A | 10/1999 | Reiter | |
| 5,983,277 A | 11/1999 | Heile et al. | |
| 5,991,771 A | 11/1999 | Falls et al. | |
| 6,014,669 A | 1/2000 | Slaughter et al. | |
| 6,026,406 A | 2/2000 | Huang et al. | |
| 6,122,630 A | 9/2000 | Strickler et al. | |
| 6,192,377 B1 | 2/2001 | Ganesh et al. | |
| 6,298,319 B1 | 10/2001 | Heile et al. | |
| 6,353,835 B1 | 3/2002 | Lieuwen | |
| 6,393,485 B1 | 5/2002 | Chao et al. | |
| 6,516,327 B1 | 2/2003 | Zondervan et al. | |
| 6,574,717 B1 | 6/2003 | Ngai et al. | |
| 6,691,139 B2 | 2/2004 | Ganesh et al. | |
| 6,839,751 B1 | 1/2005 | Dietz et al. | |
| 7,024,656 B1 | 4/2006 | Ahad | |
| 7,076,508 B2 | 7/2006 | Brourbonnais et al. | |
| 7,222,136 B1 | 5/2007 | Brown et al. | |
| 7,287,034 B2 | 10/2007 | Wong et al. | |
| 7,290,017 B1 | 10/2007 | Wang et al. | |
| 7,464,113 B1 | 12/2008 | Girkar et al. | |
| 7,627,612 B2 | 12/2009 | Ahal et al. | |
| 7,644,084 B2 | 1/2010 | Rapp | |
| 7,966,293 B1 | 6/2011 | Owara et al. | |
| 2002/0116404 A1 | 8/2002 | Cha et al. | |
| 2002/0133508 A1 | 9/2002 | Larue et al. | |
| 2002/0165724 A1 | 11/2002 | Blankesteijn | |
| 2004/0193574 A1 | 9/2004 | Suzuki | |
| 2005/0289198 A1 | 12/2005 | Todd | |
| 2006/0004691 A1 * | 1/2006 | Sifry | 707/1 |
| 2006/0212481 A1 * | 9/2006 | Stacey et al. | 707/104.1 |
| 2007/0038689 A1 | 2/2007 | Shinkai | |
| 2007/0083505 A1 * | 4/2007 | Ferrari et al. | 707/5 |
| 2007/0226277 A1 * | 9/2007 | Holenstein et al. | 707/204 |
| 2007/0239661 A1 | 10/2007 | Cattell et al. | |
| 2008/0126846 A1 | 5/2008 | Vivian et al. | |
| 2008/0222111 A1 | 9/2008 | Hoang et al. | |
| 2008/0222159 A1 | 9/2008 | Aranha et al. | |
| 2010/0036843 A1 | 2/2010 | MacNaughton et al. | |
| 2010/0145909 A1 * | 6/2010 | Ngo | 707/611 |
| 2011/0087637 A1 | 4/2011 | Sundaram et al. | |
| 2012/0054533 A1 | 3/2012 | Shi et al. | |
| 2012/0323849 A1 | 12/2012 | Garin et al. | |

OTHER PUBLICATIONS

Mohan, C., et al., "Efficient and Flexible Methods for Transient Versioning of Records to Avoid Locking by Read-Only Transactions", XP000393583, IBM Almaden Research Center, publication date Feb. 6, 1992, pp. 124-133.

Claims, EP02731965.6, 1 page.

European Patent Office, "Communication—European Search Report", Application No. 07003358.4-2201, dated May 18, 2007, 8 pages.

Teschke et al., "Concurrent Warehouse Maintenance Without Comprising Session Consistency", University of Erlangen-Nuremberg., Pub 1998, 10 pages.

Vassilakis et al., "Implementation of Transaction and Concurrency Control Support in a Temporal DBMS", Department of Information Systems, University of Athens, vol. 23 No. 5. Pub 1998, 16 pages.

Aronovich et al., "The Design of a Similarity Based Deduplication System", Systor, 2009, 14 pages.

Forman et al., "Efficient Detection of Large-Scale Redundancy in Enterprise File Systems", 8 pages, dated Jan. 2009.

The TimesTen Team, "High Performance and Scalability through Application-Tier, In-Memory Management", Proceedings of 26th International Conference on Very Large Databases, Cairo, Egypt, 2000, pp. 677-680.

Bornhovd et al., "Adaptive Database Caching with DBCache", IEEE 2004, pp. 11-18.

Harder Theo et al., "Database Caching—Towards a Cost Model for Populating Cache Groups," ADBIS 2004, LNCS 3255, A. Benczur, J. Demetrovics, 15 pages.

Oracle, "Republication—TimesTen to TimesTen", Sep. 28, 2006, http://web.achirve.org/web/20060928122432/www.oracle.com/technology/products/timesten/pdft/ds/ds_timesten_replication.pdf (3 pages).

Oracle, "TimesTen to TimesTen Replication Guide", Dec. 8, 2006, Release 6.0 http://web.archive.org/web/20061208112231rn_1/download-west.oracle.com/otn_hosted_doc/timesten/603/TimeTen-Documentation/replication.pdf (83 pages).

Oracle, "Oracle TimesTen In-Memory Database API and SQL Reference Guide," Dec. 8, 2006, Release 6.0, http://web.archive.org/web/20061208112015/download-west.oracle.com/otn_hosted_doc/timesten/603/TimesTen-Documentation/tt_ref.pdf (66 pages).

U.S. Appl. No. 12/871,805, filed Aug. 30, 2010, Office Action, mailed Jun. 28, 2013.

U.S. Appl. No. 13/161,315, filed Jun. 15, 2011, Office Action, mailed Jun. 5, 2013.

U.S. Appl. No. 12/030,094, filed Feb. 23, 2008, Final Office Action, mailed May 17, 2013.

* cited by examiner

REDUCED DISK SPACE STANDBY

CROSS-REFERENCE TO RELATED APPLICATIONS

This application is related to "Controlling Data Lag In A Replicated Computer System" U.S. patent application Ser. No. 12/871,805 filed Aug. 30, 2010; "Readable Physical Storage Replica and Standby Database System" U.S. patent application Ser. No. 11/818,975 (now issued as U.S. Pat. No. 7,734,580) filed Jan. 29, 2007; "Consistent Read in a Distributed Database Environment" U.S. patent application Ser. No. 10/119,672 (now issued as U.S. Pat. No. 7,334,004) filed Apr. 9, 2002; "Tracking Dependencies Between Transactions In A Database" U.S. patent application Ser. No. 08/740,544 (issued as U.S. Pat. No. 5,806,076) filed Oct. 29, 1996; and "Method And Apparatus For Providing Isolation Levels In A Database System" U.S. patent application Ser. No. 08/613,026 (issued as U.S. Pat. No. 5,870,758) filed Mar. 11, 1996; the entire contents of all of these patents is hereby incorporated by reference as if fully set forth herein.

FIELD OF THE INVENTION

The present invention relates to providing scalable reader farms for read-intensive database systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In a procedure referred to as data replication, modern enterprises replicate data that is primarily updated and/or accessed at a storage system, referred to herein as a "primary data system" (sometimes called a source data system), is replicated or duplicated at another storage system or location, referred to herein as "replica data system." The data stored at the primary system is referred to herein as primary data or a primary copy and the data stored at the replica system is referred to as replica data or a replica copy.

Database systems (DBMSs) are often protected using replication. Typically, one DBMS maintains the primary copy of database files and one or more other database systems referred to herein as a standby system, maintains a replica of the database files of the primary copy. The standby database system is used to back up (or mirror) information stored in the primary database system or other primary copy.

For a DBMS protected using replication, data files, redo log files and control files are stored in separate, logically or physically identical images on separate physical media. In the event of a failure of the primary database system, the information is preserved, in duplicate, on the standby database system, which can be used in place of the primary database system.

The standby database system is kept up to date to accurately and timely reproduce the information in the primary database system. Typically, redo log records ("redo records") are transmitted automatically from the primary database system to the standby database system. Information from the redo logs regarding changes that were made on the primary database system are used to replicate changes to the standby database system.

There are two types of standby database systems, a physical standby database system and logical standby database systems, which differ in the way they replicate information. In a logical replication system, operations performed on the primary system are sent to the standby system, and these operations then performed again on the standby system. Thus, the standby system need only be logically identical, but not physically identical.

In a physical standby database system, changes are made using physical replication. For physical replication, updates made to a data unit of contiguous storage (herein "data unit") at the primary data system are made to corresponding data unit replicas stored at the replica system. In the context of database systems, changes made to data blocks on the primary database system are replicated in replicas of those data blocks on the physical standby database system.

A data block is an atomic unit of persistent contiguous storage used by a DBMS to store database records (e.g. rows of a table). Thus information stored on the primary database system is thus replicated at the lowest atomic level of database storage space and a physical standby database system is essentially a physical replica of the primary database system. When records are read from persistent storage, a data block containing the record is copied into a buffer of DBMS's buffering system. The buffer usually contains many other rows and control and formatting information (e.g., offsets to sequences of bytes representing rows or other data structures, lists of transactions affecting rows).

To replicate changes from the primary database system, the standby database system scans the redo records generated for the primary database system. Redo records record changes to data blocks between a previous version of a data block and a subsequent version of the data block. A redo record contains enough information to reproduce the change to a copy of the previous version. Using information in a redo record to reproduce a change recorded by the record to a copy of the previous version of the data block to produce the subsequent version of the data block, is an operation referred to herein as applying the redo record.

Multi-Node Database Systems

High availability in terms of reliability and performance may also be provided by fault tolerance mechanisms and replication built into a multi-node system. A multi-node database system is made up of interconnected nodes that share access to resources. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. Among other functions of database management, a database server governs and facilitates access to particular database storage, processing requests by clients to access data stored in the database.

Resources from multiple nodes in a multi-node database system can be allocated to running a particular database server's software. Each combination of the software and allocation of the resources from a node is a server that is referred to herein as a "server instance" or "instance".

Processes in read-only sessions from any instance may access a data block that may be updated by another instance. Simultaneous access to data blocks must be coordinated across the multiple nodes of the system. Whenever one node updates a data block in the database storage, other nodes must be informed so that various operations may be performed in response, such as invalidating cached copies of the changed data block, refreshing the content of the cached data block, or attempting to obtain a lock on the data block that was previously locked. Various techniques may be used to ensure that atomic properties are preserved in the presence of multiple readers and writers of the data blocks.

Described herein are approaches for improving the scalability and performance of read-intensive applications.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
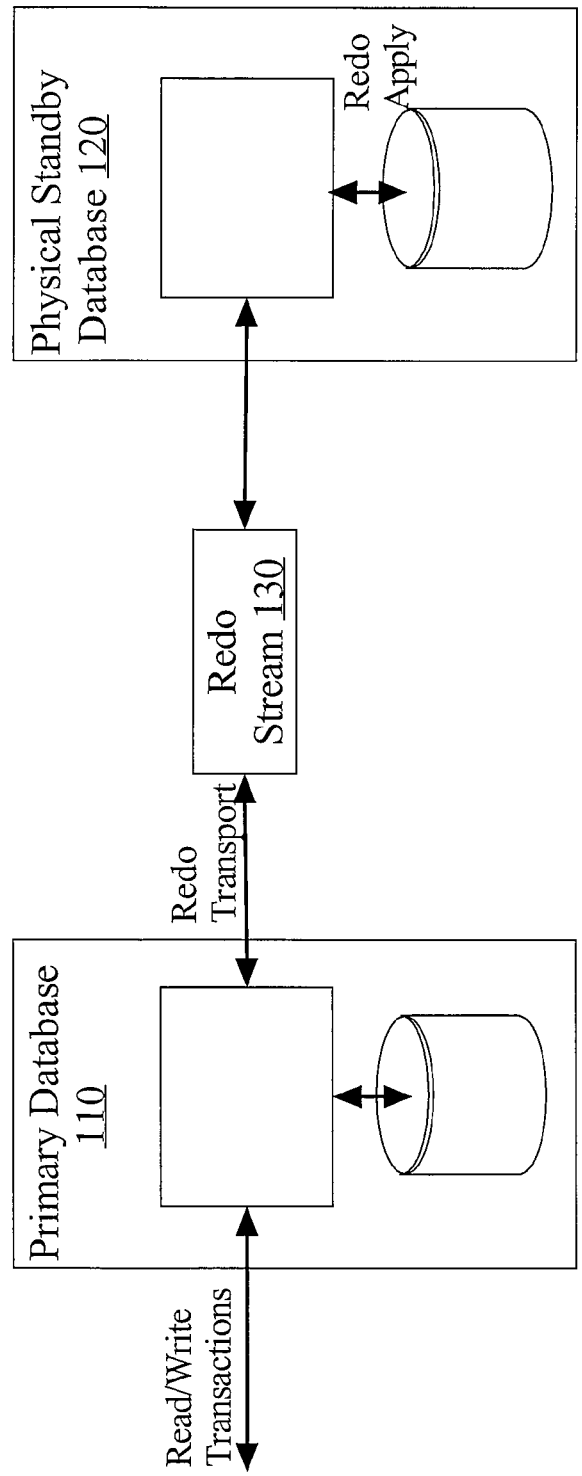
FIG. 1 is a block diagram illustrating physical replication of a database system, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Replicating data between primary database files and standby database files may be performed for fault isolation and/or for performance enhancement. For many database applications, the number of read operations dominates the number of write operations by a wide margin. Multiple standby databases offer more bandwidth for performing read operations, thereby speeding up read performance. In addition, by offloading reads from the primary database system, more capacity is left for performing writes, which speeds up write operations.

Enhancing read performance may provide overall better performance for those read-intensive applications. One way to optimize the number of concurrent read operations that can be handled by a database system is to provide multiple database processes to compute read-only queries. In addition, having these multiple database processes accessing read-only database files avoids delays due to synchronizing write access that would otherwise be needed to ensure correctness when accessing read/write database files. However, even when multiple database systems share a set of read-only database files, there is an issue of how and when updates to the read-only data are made so as to ensure that read queries are provided with current and consistent data.

In a system where database replication is used for fault isolation and recovery, performance isolation can also be achieved by splitting read and write queries. That is, write operations may be processed by the primary database system and read operations may be handled by the standby replica database system. Maintaining more than one copy of read-only physical standby database files can handle read traffic, allowing the primary database system to be offloaded and handle update queries. One problem with having a plurality of standby physical database copies is that as the amount of data maintained by the primary database system grows, the solution may not scale well because each standby replica would need to expand its storage capacity independent of the others. In other words, if N terabytes of storage is added to the primary storage system and there are M physical replicas comprising the collective standby system, M×N terabytes must be added to the collective standby storage systems. Newly added storage space to one physical standby is not shared across more than one physical instance.

Rather than using independent copies of the physical database files, one approach is for the standby system itself to be a multi-node system. Because a single copy of the physical database files is shared in a multi-node system, the storage scales well. However, each node in the multi-node system performs both read (query workload) and write (redo apply for replication) operations on the database files, and synchronizing write access is required to ensure database consistency. Although a multi-node system has the advantage of storage scaling, it does not lend itself well to optimize for workloads that are predominantly read-only.

Two techniques are described herein that are addressed to providing scalable, highly available read operations on a database system that uses replication. One approach is to use multiple standby database systems, each of which manages a separate physical copy of the database files that are updated through change records received from the primary database system. To address the storage scalability issue, the standby physical database replicas are stored in a shared storage system that employs de-duplication techniques. In that way, the amount of storage required by the storage system as a whole may grow approximately proportionately to the growth of the primary database system because only one copy of identical data blocks is physically stored and shared across the multiple databases. One benefit of this approach is that the standby database systems may operate independently from one another. In other words, no direct coordination among the standby replicas is needed, saving communication overhead and concern over correctness if such communication were to be lost. Also, the de-duplication techniques are encapsulated within the storage system, and hidden from the database system. Thus, no change is required to existing systems to take advantage of the scalability benefits. The database system and de-duplicating storage system may be used synergistically to address an issue for which neither was specifically designed.

Another approach is to use diskless standby database systems. Although a "diskless" standby system may store certain files such as temporary files for sorts, configuration files, trace files, etc. on a local disk, no disk space is allocated to data files locally on these 'diskless' databases. That is, one main standby system may receive changes from the primary database system and apply those changes to a single copy of the standby physical database files. Multiple diskless standby database systems share the standby physical database files in read-only mode. In that way, as the primary database system grows, storage for only one copy of the standby physical database files needs to be allocated accordingly. This approach has an advantage that only one copy of the change records needs to be sent to a physical standby database system, and these change records only need to be applied to one set of physical database files. A challenge of this approach is coordinating the diskless standby systems so that data blocks and metadata that are cached within each diskless standby database system is consistent with the version of data in the shared physical standby database files. The approach includes a main standby database system sending asynchronous notifications to the diskless standby systems to communicate version information.

Further scalability may be achieved by using a plurality of standby physical databases, each of which may be a main standby for a set of diskless standbys that share a copy of physical database files for responding to read-only queries.

Example DBMS Environment

FIG. 1 depicts a source and standby database system according to an embodiment of the present invention. Physical Standby Database System 120 is a physical standby database system for Primary Database System 110. From a redo log of Primary Database System 110, Physical Standby Database System 120 receives a stream of redo records (a Redo Stream 130) and applies them to data blocks of the database files managed by Physical Standby Database System 120. Redo log records are stored in the redo log in the order that the redo log records are generated. The redo log records occur in the same order in the Redo Stream 130 as they do in the redo log of System 110. Multiple processes running within Physical Standby Database System 120 each apply a subset of redo records from the redo stream to data blocks within Physical Standby Database System 120. The redo records are not applied in the same order that they occur in the stream. However, with respect to a given data block, redo records are applied in the precise order that the records occur in the stream.

While Physical Standby Database System 120 applies redo records from the redo stream, Physical Standby Database System 120 is able to process queries submitted by, for example, a user. Physical Standby Database System 120 is able to process queries that reflect a consistent state of the Primary Database System 110 that is no later than the latest-readable query time. The latest-readable query time is calculated by the Physical Standby Database System 120 based on the records applied from the Redo Stream 130.

Redo log records include other kinds of records other than block change records. For example, a redo record may include a commit record, which is generated when a transaction is committed. The redo records for a transaction occur earlier in order in the redo log and redo stream than a commit record for the transaction.

As transactions are committed by a database system, the database system transitions from one transactional consistent state to another transactional consistent state. A transactional consistent state is one in which the database files managed by a database system is able to reflect all changes made by committed transactions and none of the changes made by the uncommitted transactions.

A logical time is associated with each consistent state. The logical time for a subsequent consistent state is later than the logical time for the previous consistent state. An example of a logical time is a system change number (SCN), sometimes referred to as a "System Commit Number." Each commit of a transaction is associated with a SCN. A counter for the SCN is incremented whenever a transaction is committed and/or the commit record for the transaction is generated. The transaction and its commit record are associated with the new counter value or SCN. Transactions recorded with redo records are associated with their corresponding SCNs therein.

Embodiments of the invention are further illustrated herein within the context of SCNs. However, the present invention is not limited to a logical time in the form of an SCN. In order to process a query that is consistent with the state of Primary Database System 110 at a particular SCN, the redo records associated with all previous SCNs must have been applied by the Physical Standby Database System 120. Thus, when Physical Standby Database System 120 has determined that records for all SCNs prior to a particular SCN have been applied, it advances the latest-readable SCN (i.e. latest-readable query time) to that particular SCN.

A query may be represented by a database statement that conforms to a database language. Examples of database languages include a Structured Query Language (SQL) that conform to American National Standards Institute (ANSI) standards, and propriety forms (e.g. PL/SQL, other SQL standards of Oracle Corporation).

Use of De-Duplicating Storage System

A storage system is comprised of blocks of disk space that are managed by the system. A file system manages files that are collections of data blocks. A database manager may manage a collection of files that comprise the database. Completely separate database systems with different names and comprised of disjoint sets of files may be stored within a common storage system.

When a storage system employs de-duplication techniques, the storage system may recognize when two data blocks have identical content and only store one copy of the data block on disk. If two files include that same content, both files may reference the same data block on disk. Thus, if more than one database system includes a file that includes the same content, a very small amount of additional disk space may be needed to store the additional replica databases, because the common data blocks may be shared across databases. In this way, multiple physical databases can share a common storage system, and the common storage system provides scalability. As more disk space is added to the common storage system, all physical databases sharing the storage system can share in the use of the newly added disk space.

Figure 2:
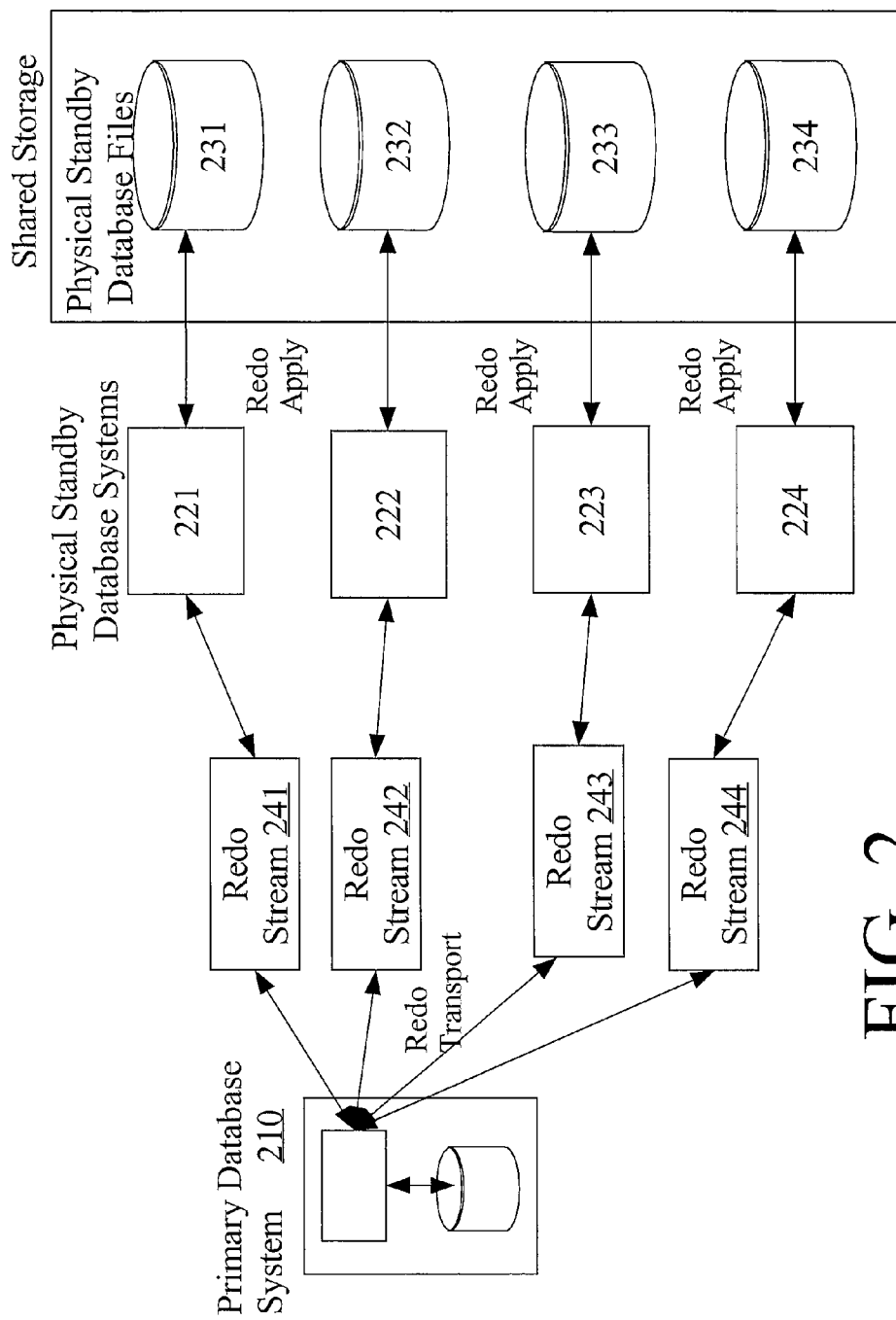
FIG. 2 is a block diagram illustrating physical replication that includes multiple physical standby databases that share a common storage area, according to an embodiment of the invention.

FIG. 2 is a block diagram showing how combining the use of multiple physical standby databases systems with a storage system that provides de-duplication of database files may provide for scalability in a system where the majority of traffic is read-only. Similar to the diagram in FIG. 1, a Primary Database 210 supplies a Redo Stream 241 to a Physical Standby Database System 221 that applies the changes from the Redo Stream 241 to the Physical Standby Database Files 231. However, FIG. 2 shows the Primary Database System 210 sending multiple Redo Streams (241-244) to respective Physical Standby Database Systems (221-224), and each Physical Standby Database System (221-224) using the change information contained within its own copy of the change records to update in parallel its respective Physical Standby Database Files (231-234) in parallel. The Physical Standby Database Files (231-234) associated with each of the standby database systems (221-224) are logically and physically distinct. For example, each set of database files may have a different name. However, because these physical standby databases share a common storage area that provides de-duplication, the multiple copies of each identical data block may be consolidated into a single data block. The files comprising each distinct physical database copy may contain references to the shared data blocks. Thus, the references, such as a block address, to the data blocks may be duplicated, but the data blocks themselves are not replicated. The references may be much smaller than a data block. Such a solution has the benefit of providing multiple physical standby database systems to handle read-only queries concurrently as well as the scalability of shared storage. When additional storage space is added to the shared storage, all physical standby databases benefit.

Diskless Reader Farms

Figure 3:
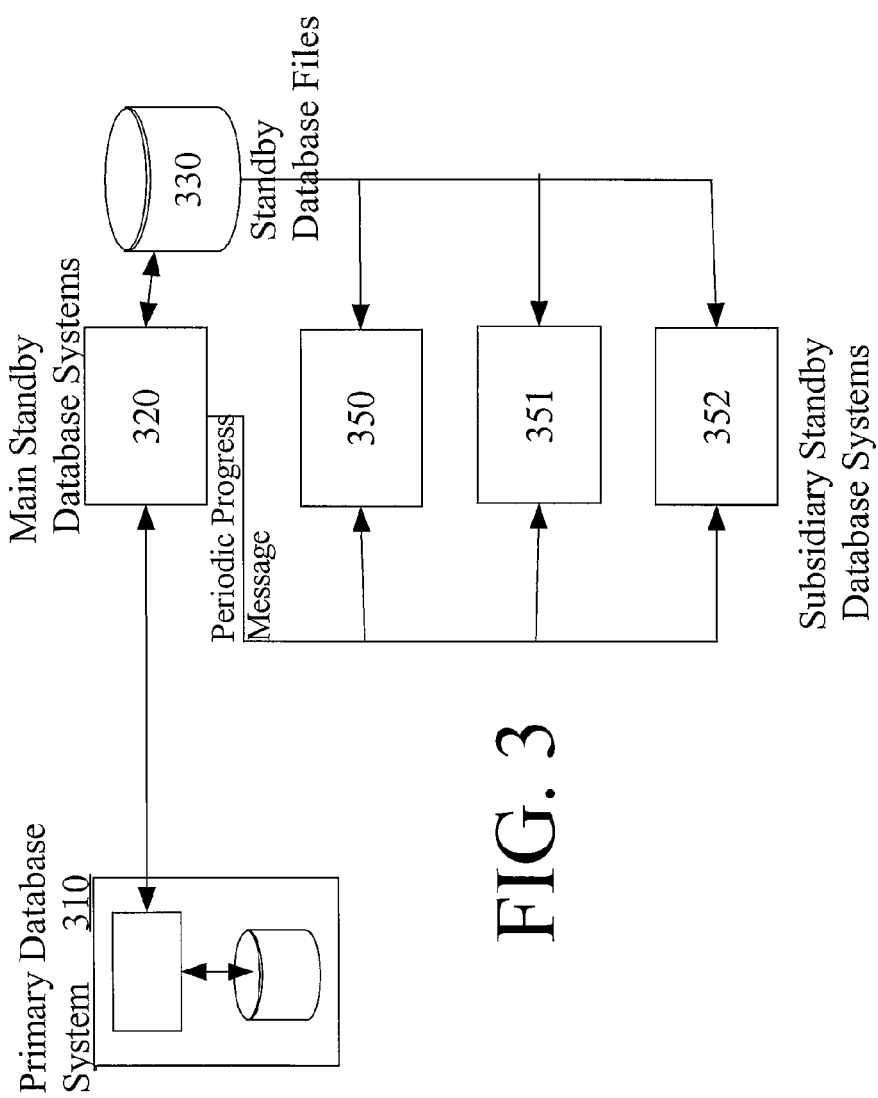
FIG. 3 is a block diagram illustrating physical replication where single physical standby database files are shared by multiple diskless subsidiary standby database systems to service read-only queries, according to an embodiment of the invention.

FIG. 3 is a block diagram that shows an example of a diskless reader farm. A diskless reader farm is comprised of a Primary Database System 310, a Main Standby Database System 320, and at least one Diskless Subsidiary Standby Database System 350, 351, and 352. "Diskless Subsidiary Standby Database System" may be abbreviated herein to "diskless standby" or "subsidiary standby." Update operations are processed only on the Primary Database System 310, and as a result of processing updates, change records are generated and sent to the Main Standby Database System 320 that updates its Standby Database Files 330 by writing the updated data blocks through the in-memory cache of the Main Standby Database System 320. After the change records are applied to the Standby Database 330, a new SCN representing the last consistent read time is determined for the Standby Database Files 330.

The Main Standby Database System 320 generates and sends a periodic progress message to each of the Subsidiary Standby Database Systems (350, 351, and 352). The Periodic progress message includes information regarding which disk blocks have changed since the last SCN checkpoint, and provides the new query SCN number representing the last consistent read time for the Standby Database Files 330.

Each of the Subsidiary Standby Database Systems (350, 351, and 352) that share the Standby Database Files 330 (for reading only) receives the periodic progress message and responds by invalidating the data blocks in their respective in-memory caches corresponding to the data blocks that were updated in the shared Standby Database Files 330 and updates their respective query SCN's based on the SCN contained in the periodic progress message. Although the SCN representing the state of the standby database files may lag the SCN representing the state of the primary database files, the subsidiary standby database systems need only ensure that their copy of the SCN tracks the SCN representing the state of the Standby Database Files 330 so that each subsidiary database system may provide current data for servicing read-only queries.

Figure 4:
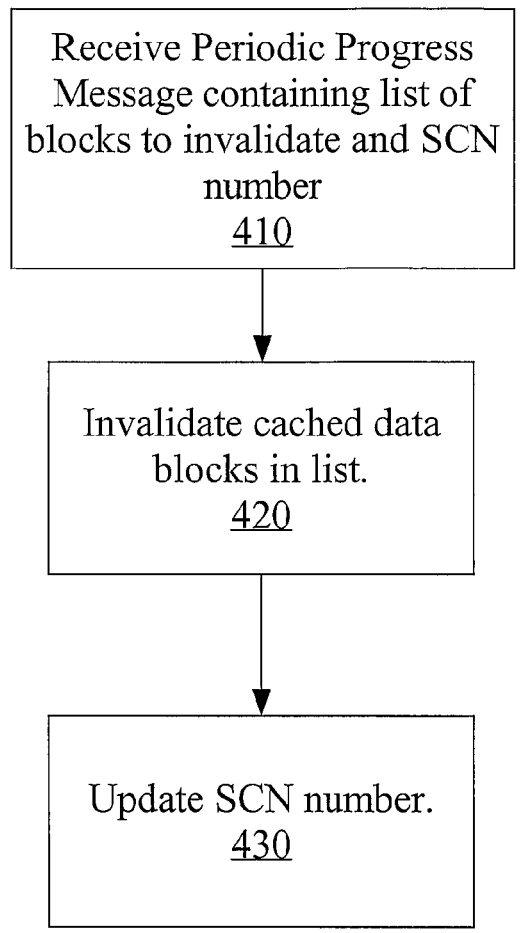
FIG. 4 is a flow diagram showing the steps for synchronizing database state between a main standby database system that manages the physical database files and diskless subsidiary standby database systems, according to an embodiment of the invention.

FIG. 4 is a flow diagram that shows the process for synchronizing version information between the main standby database system and the diskless subsidiary standby systems. In Step 410, a periodic progress message is sent from the main standby to each diskless subsidiary. The progress message may contain a list of data block addresses and metadata identifiers. Cached copies of the metadata and data blocks at the specified addresses become invalidated in the cache of the notified subsidiary standby system. The message need not contain an indication of the changes made to the data blocks or metadata. Data blocks in the cache may be labeled as "Current" or "Consistent" as will be explained in more detail below. Only data blocks labeled Current may be invalidated in response to the periodic progress message. Invalidating a cached item causes the item to be read from the physical database files the next time the content of the item is required to compute a query. The diskless standby database system refreshes the cache by reading a new version of the data block from the shared physical database files.

An SCN may also be communicated along with the periodic progress message to allow subsidiary standby databases to respond to read queries based on the latest version of consistent data in the standby physical database files. In Step 420, each subsidiary standby system invalidates metadata and each of the cached data blocks according to the invalidation list contained in the periodic progress message, and in Step 430 each subsidiary standby system may update its SCN number. If the SCN were updated before invalidating the cached items that were updated on disk, incorrect results could be returned for a query relying on the data in the changed data blocks. For example, updating the SCN and invalidating cached items are not performed atomically. If a query is received after updating the SCN and before the cache is invalidated, the subsidiary standby database system would not know to refresh the cache before processing the query. Thus, it is necessary to invalidate cached items before updating the corresponding SCN.

In one embodiment, a reliable network may be used to communicate messages between the main and subsidiary standbys. A reliable network guarantees delivery of asynchronous notification messages sent from the main standby to the subsidiary standbys. This ensures that invalidation messages cannot be missed and thus, guarantees that each subsidiary standby will use correct data to respond to queries. When there is guaranteed delivery of messages, a periodic progress message may be sent together with an SCN update or they may be sent independently from one another, provided that the invalidation message is processed before the corresponding SCN is updated.

Ensuring Correctness Even when Notification Messages are not Received

In another embodiment, an unreliable network may be used to communicate asynchronous notification messages. If an unreliable network is used, it may be possible for a subsidiary standby to not receive a message that was sent, and thus, there may be a need to detect and recover from such missed messages. In an embodiment, the SCN may be sent in the same message as the periodic progress message to ensure that either both are received or neither is received. In the message we may also include a consecutive sequence number. If a subsidiary standby database system receives a progress message containing a sequence number that is not consecutive relative to the previous message, the subsidiary standby may recognize that an intervening message was not received. For example, if the sequence numbers received have been 28, 29, 30, and the next received sequence number is 32, the subsidiary standby system may conclude that it missed an update corresponding to sequence number 31. In an embodiment, recovery may be accomplished by invalidating all data blocks and metadata residing in the cache. In another embodiment, recovery may be accomplished by requesting the main standby to resend the previous, missed message.

The SCN that is sent from the main standby database server to the subsidiary standby database systems represents the latest consistent version that is stored in the database files. When a subsidiary standby database system processes a query, the query is processed relative to the SCN version number. There may be a time interval during which the SCN known to the main standby database system of the state of the physical standby database files represents a later version than the SCNs known to the diskless standby database systems.

If an SCN notification message never reaches a subsidiary standby system, the subsidiary standby may still respond to queries using a consistent version of data that is not the most current data available on the disk. For example, the main standby database system may apply change records to a set of data blocks and update the SCN. Before a particular subsidiary receives and processes the notification message to synchronize to the new version, a query may be received that requires data for which a change was committed since the last SCN update. Although the committed change would not be reflected in the query results, the query may be processed as of the subsidiary standby's system's SCN because there is still a consistent version of data corresponding to the subsidiary standby's SCN. The data may even be served out of the cache.

Generating a Block on a Subsidiary System for Current Standby SCN

If the cache maintains multiple versions of a block, when a periodic progress message is received, only the current version of the data blocks is invalidated. There may be older versions that are still in the cache, but they can be left as is because they are still valid for queries as of those older versions.

When a data block is needed to satisfy a query on the subsidiary system, if the cached version is invalidated, a new copy of the block is retrieved from disk. When a data block is read from disk, the disk version must have already been updated to contain all changes generated on the primary up to the subsidiary system's current SCN, and may include changes after the subsidiary system's current SCN. This is because the main standby system would only send out the SCN notification message after all changes below the SCN in the message are reflected on disk. If the disk block read from the disk contains changes corresponding to an SCN the future of the subsidiary system's current SCN, the subsidiary can generate a block of the required SCN by applying one or more undo records to rollback the data.

It is possible that during the process of rolling back changes in the data block that are uncommitted as of subsidiary standby's current SCN, the subsidiary standby needs to get corresponding undo records at versions higher than the subsidiary standby's current SCN. The subsidiary standby may wait until the main standby writes the corresponding undo records to disk. This can be done either through a message back to the main standby, or having main standby put write of undo records at higher priority than write of regular data blocks.

Creating a Hierarchy of Standbys for Further Scalability

Each storage system has a finite limit on the amount of bandwidth it can support. Thus, for each copy of physical database files in each storage system, there is a limit to the number of diskless read-only standbys that may be supported. If more standby replicas are needed to process read-only queries, then additional copies of physical database files in additional storage systems are needed. Thus, a hybrid approach may be used.

Figure 5:
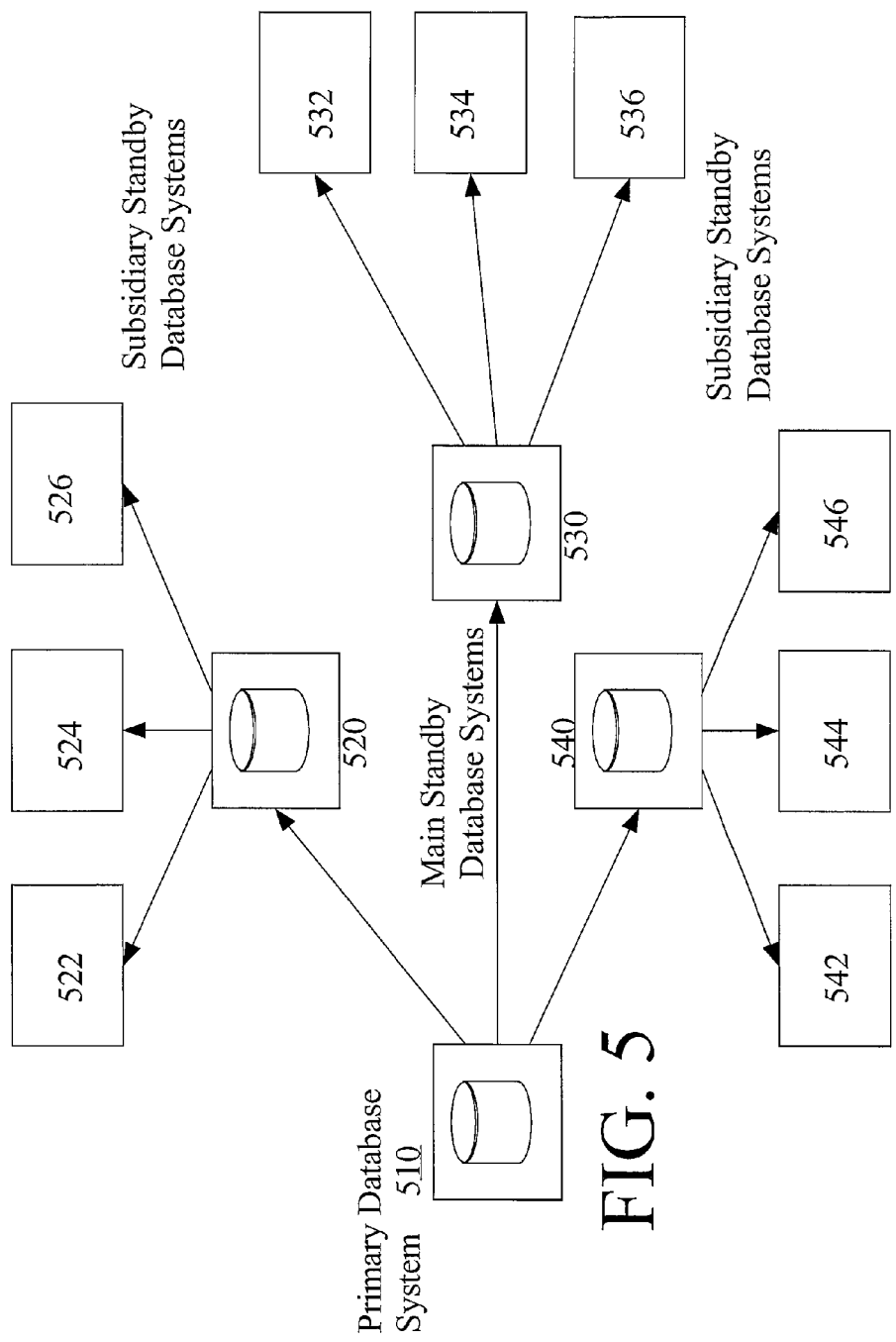
FIG. 5 is a block diagram of a hierarchical, hybrid system that uses multiple main standbys managing physical databases with each main standby sharing persistent data with a set of diskless subsidiary standby database systems, according to an embodiment of the invention.

FIG. 5 is a block diagram showing an example of such a hybrid approach. Each rectangle in the diagram represents a database system. Those rectangles that include a disk symbol manage a copy of physical database files and those without the disk symbol are diskless database systems. When a diskless database system attempts to compute a query and does not have valid data stored in its in-memory cache, the diskless database system reads data stored persistently from another physical standby database copy that it may share with other diskless database systems. The Primary Database System 510 sends change records to Physical Database Systems 520, 530, and 540. These systems independently apply the change records to their respective copies of physical database files, and each standby physical database system sends asynchronous notification messages to the diskless subsidiary standby database systems that share the physical database files that were just updated. For example, Main Standby Database System 520 sends notification messages to Subsidiary Standby Database Systems 522, 524, and 526 while Main Standby Database System 530 sends notification messages to diskless Subsidiary Standby Database Systems 532, 534, and 536. The notification message sent to each subsidiary standby database system includes the addresses of data blocks and metadata that changed in the database files as a result of applying the change records, and also includes the new SCN representing the state of the physical database files. Each copy of physical standby database files is represented by its own SCN.

Equivalents, Extensions, Alternatives & Miscellaneous

Thus, example embodiments relating to physical replication have been described in the context of database systems, but the present invention is not so limited. For example, an embodiment may be implemented within the context of storage-based remote mirroring systems, where the data units or data blocks correspond to sectors, redo records correspond to change descriptions, and the latest-readable query time corresponds to a latest-readable time for which read operations are performed.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
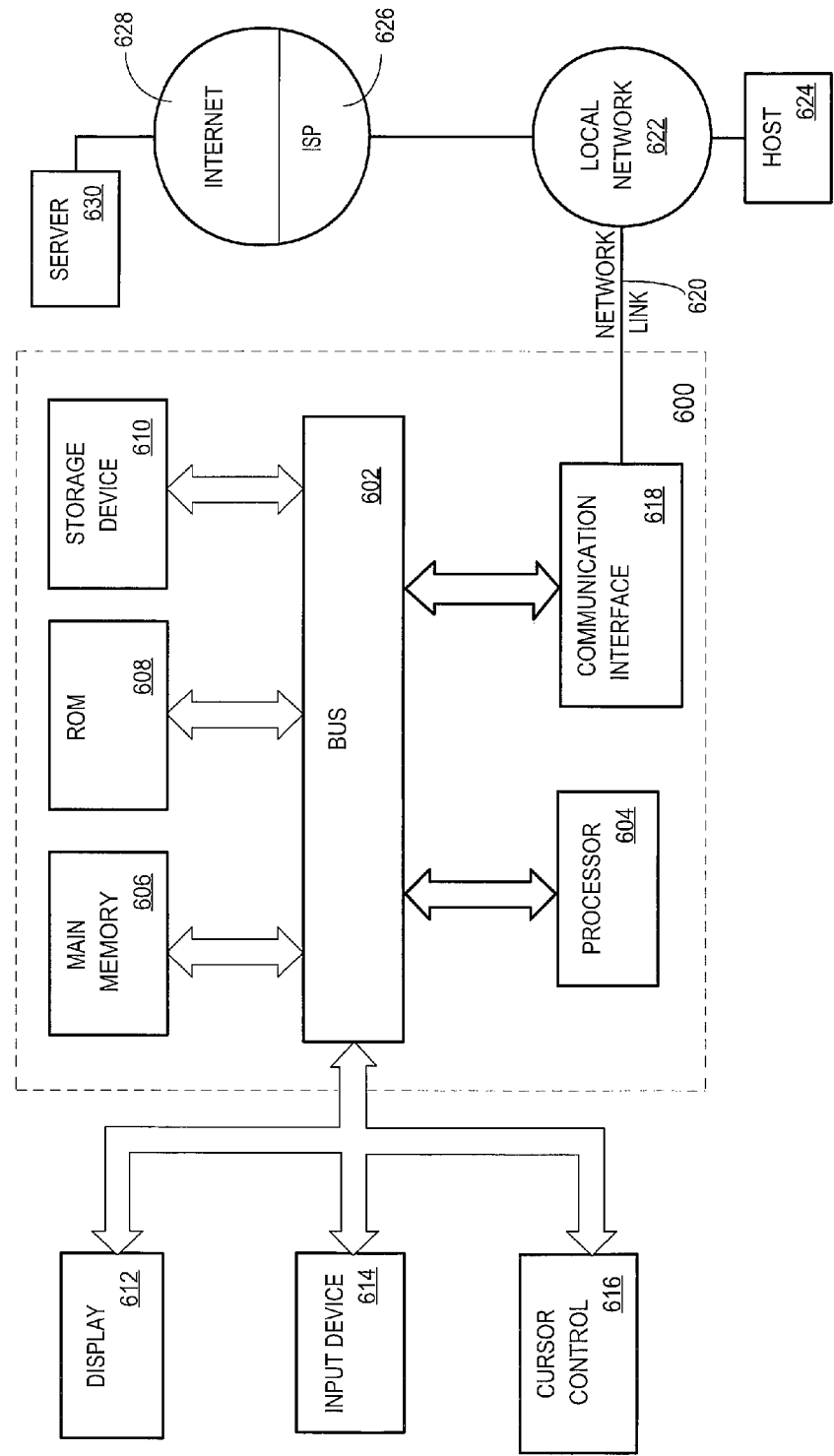
FIG. 6 is a block diagram that illustrates a computer system upon which an embodiment in accordance with the present invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
a main standby database system applying changes to standby database files, wherein the changes were made to a primary database of a primary database system;
in response to applying changes, advancing an established logical time associated with a consistent state of the primary database system for computing queries to a particular logical time associated with a subsequent consistent state of the primary database system;
sending to one or more subsidiary standby database systems said particular logical time, wherein said one or more subsidiary standby database systems do not apply said changes to said standby database files; and
while said main standby database system is applying said changes to said standby database files:
receiving a query issued to a subsidiary standby database system of the one or more subsidiary database systems; and
said subsidiary standby database system computing results for said query that are consistent with said particular logical time based on data read from said standby database files;
wherein each of the above steps is performed by one or more computing devices.

2. The method of claim 1, further comprising said one or more subsidiary standby database systems receiving a set of invalidation records, wherein an invalidation record of the set of invalidation records identifies portions of an in-memory cache to mark as invalid;
wherein the portions of the in-memory cache to mark as invalid correspond to the changes applied to said standby database files; and
marking the portions of the in-memory cache as invalid.

3. The method of claim 1, further comprising sending one or more notification messages to one or more subsidiary standby database systems, wherein each of the one or more notification messages includes an SCN.

4. The method of claim 3, wherein each of the one or more notification messages includes a set of invalidation records.

5. The method of claim 3, wherein a notification message is received by a particular subsidiary standby database system; and
in response to determining that a sequential query number in the notification message is not consecutive with a current sequential query number, determining to invalidate all data blocks cached in the subsidiary standby database system.

6. A non-transitory computer-readable medium storing one or more sequences of instructions which, when executed by one or more processors, cause performing of:
a main standby database system applying changes to standby database files, wherein the changes were made to a primary database of a primary database system;
in response to applying changes, advancing an established logical time
associated with a consistent state of the primary database system for computing queries to a particular logical time associated with a subsequent consistent state of the primary database system;
sending to one or more subsidiary standby database systems said particular logical time, wherein said one or more subsidiary standby database systems do not apply said changes to said standby database files; and
while said main standby database system is applying said changes to said standby database files:
receiving a query issued to a subsidiary standby database system of the one or more subsidiary database systems; and
said subsidiary standby database system computing results for said query that are consistent with said particular logical time based on data read from said standby database files.

7. The non-transitory computer-readable medium of claim 6, wherein the one or more sequences of instructions further cause performing of:
said one or more subsidiary standby database systems receiving a set of invalidation records, wherein an invalidation record of the set of invalidation records identifies portions of an in-memory cache to mark as invalid;
wherein the portions of the in-memory cache to mark as invalid correspond to the changes applied to said standby database files; and
marking the portions of the in-memory cache as invalid.

8. The non-transitory computer-readable medium of claim 6, wherein the one or more sequences of instructions further cause performing of:
sending one or more notification messages to one or more subsidiary standby database systems, wherein each of the one or more notification messages includes an SCN.

9. The non-transitory computer-readable medium of claim 8, wherein each of the one or more notification messages includes a set of invalidation records.

10. The non-transitory computer-readable medium of claim 8, wherein a notification message is received by a particular subsidiary standby database system, and wherein the one or more sequences of instructions further cause performing of:
in response to determining that a sequential query number in the notification message is not consecutive with a current sequential query number, determining to invalidate all data blocks cached in the subsidiary standby database system.

* * * * *